(12) United States Patent
Jones

(10) Patent No.: US 6,275,337 B1
(45) Date of Patent: Aug. 14, 2001

(54) METHOD FOR VIEWING THROUGH REFLECTIONS FROM A REFLECTIVE SURFACE WITHOUT AFFECTING POINT OF IMPACT

(75) Inventor: Peter W. J. Jones, Belmont, MA (US)

(73) Assignee: Tenebraex Corporation, Boston, MA (US)

( * ) Notice: Subject to any disclaimer, the term of this patent is extended or adjusted under 35 U.S.C. 154(b) by 0 days.

(21) Appl. No.: 09/421,581

(22) Filed: Oct. 20, 1999

Related U.S. Application Data
(60) Provisional application No. 60/105,025, filed on Oct. 20, 1998.

(51) Int. Cl.[7] .................................................... G02B 27/28
(52) U.S. Cl. ......................... 359/493; 359/483; 359/501; 356/21; 33/233; 33/242; 33/244
(58) Field of Search .......................... 33/233, 242, 244; 359/243, 251, 493, 501, 483; 356/21

(56) References Cited

U.S. PATENT DOCUMENTS

| | | | |
|---|---|---|---|
| 3,782,822 | * | 1/1974 | Spence .................................... 356/21 |
| 5,495,676 | * | 3/1996 | Chestnut et al. ......................... 33/244 |

\* cited by examiner

Primary Examiner—Cassandra Spyrou
Assistant Examiner—Craig Curtis
(74) Attorney, Agent, or Firm—Peter F. Corless; Lisa Swiszcz Hazzard; Dike, Bronstein, Roberts & Cushman, IP Group Edwards & Angell LLP

(57) ABSTRACT

Featured is a method and device that minimize the effects of reflections from a transparent surface while viewing an object or target area through such reflective surface and which accomplishes this without affecting the crucially important accuracy of showing where a projectile from a weapon should impact a target. A method for viewing an object from a first side of a transparent medium, the first side being a reflective surface, when the object is located on an opposite side of the transparent medium, includes the steps of providing a telescopic viewing mechanism, mounting a filter at an exit aperture of the viewing mechanism and passing light from the object through the viewing mechanism and through the filter. The filter is configured to significantly attenuate light being reflected from the first side and in a particular embodiment is a polarizing filter. The method further includes filtering the light, being reflected from the first side and passing through the telescopic viewing mechanism, using the filter. In such a method the reticle of the telescopic viewing mechanism is not shifted from the point of impact. Also featured is a method for attenuating light being reflected from a transparent member and an apparatus including a weapon sight or telescopic viewing mechanism and a polarizing filter mounted rearwardly of the weapon sight.

13 Claims, 2 Drawing Sheets

METHOD FOR VIEWING THROUGH REFLECTIONS FROM A REFLECTIVE SURFACE WITHOUT AFFECTING POINT OF IMPACT

This application claims the benefit of U.S. Provisional Application Ser. No. 60/105,025 filed Oct. 20, 1998, the teachings of which are incorporated herein by reference.

FIELD OF INVENTION

The present invention relates generally to methods and devices that minimize the effects of reflections from a transparent surface and more particularly to methods and devices that minimize the effects of reflections from a transparent surface while viewing an object or target through such reflective surface by a weapon sight without affecting the projected point of impact of the projectile from the weapon using the sight.

BACKGROUND OF THE INVENTION

The reflections 2 (FIG. 1) of the sun 2, sky or other bright source from a surface 4 of a transparent member, such as a window of a building or motor vehicle (e.g., automotive windshield) have long been a problem in a number of cases because they tend to obscure the target or object one is attempting to view through the reflective surface. For example, when a police officer, federal law enforcement official or other authorized person (e.g., soldier) is trying to view a target area that is behind the transparent member, the view is obscured by the reflections 6. This obstruction of the view occurs because such reflections 6 of the sun 2 or the sky can be much brighter than the image of the target area that lies behind the transparent member surface 4.

This obstruction of the view is particularly dangerous in hostage type of situations because the reflections 6 can obscure the police officer's, federal official's or military personnel's view of the target area. This problem can be especially dangerous during situations such as hostage crisis area, because it can prevent the police officer, federal official or soldier from determining who is a hostage and who is the hostage taker.

The reflections 6 of the sun 2 from the surface 4 are mainly in the form of linearly polarized rays 8. Accordingly, one method for reducing or eliminating the effect of such linearly polarized reflections or rays 8 from the transparent surface 4 involves placing a polarizing filter in front of the optical device or optical lens assembly being used to view the target area. The polarizing filter suppresses the reflections and provides a clearer view to the subject beyond the surface causing the reflections. For example, fishermen use polarized sunglasses to suppress the reflections from the water's surface so they can better see their prey. In another example, photographers use a polarizing filter mounted on the front of the camera lenses to suppress reflections from building windows.

When this particular technique is applied to a sight for a weapon such as a rifle of a police officer or federal official, which is the common practice, other problems can arise. For example, when a polarizing filter is mounted in front of an optical system of the weapon sight, the polarizing filter can act like an optical wedge, thus refracting the light rays entering the optical system of the weapon sight thereby causing the image to be shifted slightly. Because this image shifting occurs before the image gets to the reticle or reticule provided within the optical system of the weapon sight, this shifting changes the point of impact for a projectile fired from the weapon as projected by the weapon sight. This can result, consequently, in the shooter not hitting the intended target at all or where intended or possibly striking another when the intended target is missed altogether (e.g., wrong target or bystander).

A missed shot or not hitting the target where intended can be dangerous particularly such as when dealing with a hostage crisis. This also applies in the case where a shot is not taken at all because of the targeting uncertainty created by the particular method or device used to attenuate the surface reflections. In such cases the inability or failure to take a shot or to take the intended shot can lead to the loss of life or serious injury to the hostages or innocent bystanders.

It thus would be desirable to provide a new method, technique and device that reduces or attenuates the reflections from the surface of a transparent member. It would be particularly desirable to provide new methods and devices that minimize the effect of such reflections while viewing an object or target through the reflective surface of the transparent member by a weapon sight without affecting the projected point of impact of the projectile from the weapon sight or other telescopic viewing mechanism. Such methods and devices preferably would be simple in construction and would not require highly skilled users to utilize the device or require sophisticated or detailed procedures for using such a device in the field.

SUMMARY OF THE INVENTION

The present invention generally features a method and device that minimize the effects of reflections from a surface of a transparent member while viewing an object or target area through the reflective surface of the transparent member. In particular, when viewing an object or target when using a sight for a weapon, such as a telescopic weapon sight, without affecting the sight's projected point of impact of the projectile that can be fired from the weapon.

According the present invention there is featured a method for viewing an object from a first side of a transparent medium, the first side being a reflective surface, when the object is located on an opposite side of the transparent medium. The viewing method includes the steps of providing a telescopic viewing mechanism, mounting a filter at an exit aperture of the telescopic viewing mechanism and passing light from the object through the telescopic viewing mechanism and through the polarizing filter. The filter also is configured to significantly attenuate light being reflected from the transparent member first side and in a particular embodiment is a polarizing or polarizer filter. The method further includes filtering the light being reflected from the transparent member first side and passing through the telescopic viewing mechanism using the filter.

In this way, the internal sighting or aligning mechanism (e.g., reticle) provided or included with the telescopic viewing mechanism will not be shifted from the point of impact because of the image being shifted by the refraction of the front mounted filter. Rather, mounting the filter at the exit aperture results in the image and the internal sighting mechanism (e.g., reticle) being shifted at the same time.

In particular embodiments, the telescopic viewing mechanism is a telescopic sight for a weapon and wherein the step of mounting includes disposing the filter optically behind the weapon sight, more specifically the eyepiece of the weapon sight. More particularly, the filter is disposed optically behind the internal image and reticle of the weapon sight. In this way and as also described above, the reticle of the weapon sight and image being viewed shift at the same time. Consequently, the point of impact for the projectile (e.g., bullet) fired from the weapon does not change from that being shown by the weapon sight.

According to the present invention there also is featured a method for attenuating light being reflected from a reflective surface of a transparent member while viewing an object located opposite to the reflective surface using a telescopic viewing mechanism. This light attenuating method includes mounting a polarizing filter proximal an exit aperture of the telescopic viewing mechanism such as the sight for a weapon, filtering the light being reflected by the reflective surface and passing through the telescopic viewing mechanism using the polarizing filter and passing light from the object through the telescopic viewing mechanism and the polarizing filter for viewing.

When the telescopic viewing mechanism is a telescopic sight for a weapon, the filter is mounted so that it is located optically behind the weapon sight. More specifically behind the eyepiece of the weapon sight, and more particularly, the filter is disposed optically behind the internal image and reticle of the weapon sight. In this way, the reticle of the weapon sight and image being viewed are shifted at the same time while attenuating the reflections. Consequently, the point of impact for the projectile (e.g., bullet) fired from the weapon does not change from that being shown by the weapon sight when attenuating the reflections from the transparent member surface, which is in contrast to that experienced using conventional techniques for attenuating reflections.

Also featured is a device that minimize the effects of reflections from a transparent surface while viewing an object or target through such reflective surface using such a device without affecting the projected point of impact of the projectile from the weapon using the sight. Such a device includes a telescopic viewing mechanism having an internal sighting mechanism, and a filter such as a polarizing filter mounted proximal the exit aperture or eyepiece of the telescopic viewing mechanism.

Other aspects and embodiments of the invention are discussed below.

BRIEF DESCRIPTION OF THE DRAWING

For a fuller understanding of the nature and desired objects of the present invention, reference is made to the following detailed description taken in conjunction with the accompanying drawing figures wherein like reference character denote corresponding parts throughout the several views and wherein.

DESCRIPTION OF THE PREFERRED EMBODIMENT

Figure 1:
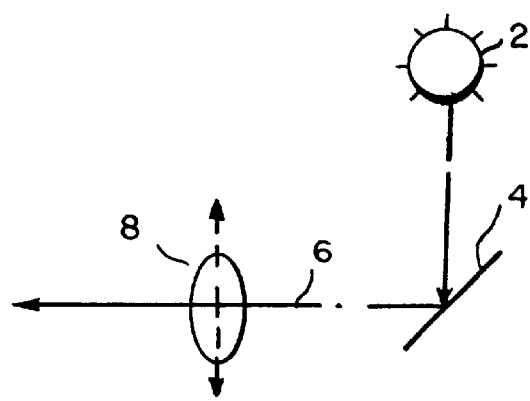
FIG. 1 is a diagrammatic view of a transparent member and the sun to illustrate reflection from a transparent member surface

As noted herein, the present invention generally features methods and devices that minimize the effects of reflections from a transparent surface while viewing an object or target through such a reflective surface. Such methods and devices also minimize these reflections without affecting the ability of the viewing mechanism to project the point of impact of the projectile to be fired from the weapon. Before describing the present invention, a prior art method for attenuating such reflections and the shortcomings therefore is described with particular reference to FIGS. 1–5. It should be noted that with regards to the various figures of the subject application, like reference characters shall be understood to be referring to like parts or features.

Referring now to FIG. 1, and as indicated elsewhere herein, the reflections 6 of the bright source such as the sun 2 from the surface 4 of a transparent member are mainly in the form of linear polarized rays 8. There also is shown diagrammatically in FIG. 2, a situation in which a person is looking through a weapons sight 20 at the windshield 32 of a motor vehicle 30 to see a person 10 or subject within the motor vehicle and on the other side of the windshield. When looking through the weapons sight 20, the eye 14 of the person sees the reflections 6 coming from the surface of the windshield as well as the un-polarized light, interior vehicle light 7, coming directly from within the motor vehicle 30 that is in the field of view of the weapons sight. Because the reflections 6 from the surface of the windshield 32 are brighter than the interior vehicle light 7, the reflections effectively obscure the interior vehicle light 7 from the person's eye 14. In other words, the reflections 6 interfere with the view of the person, for example, the police officer, federal official or soldier (i.e., the shooter), who is looking through and using the weapon sight 20 so that they are unable to clearly see or see at all the interior of the motor vehicle, including the person 10 or objects therein.

Figure 3:
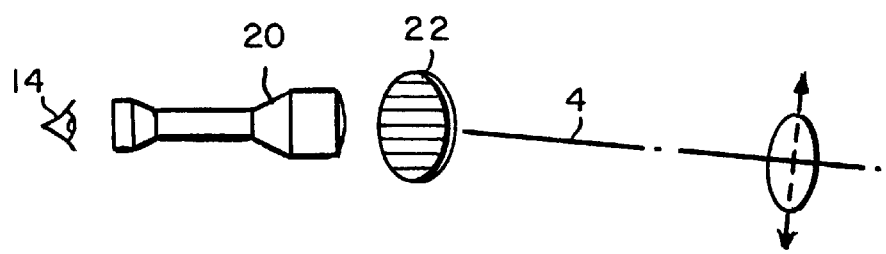
FIG. 3 is a diagrammatic view illustrating a conventional technique for attenuating reflections to a weapon sight.

Referring now also to FIG. 3, there is shown a polarizing filter 22 as is known in the art that is used to attenuate linearly polarized light rays 4 such as that comprising the reflections 6 from the surface of a transparent member. With a polarizing filter 22, in order to block or attenuate the polarized light the polarizing filter 22 is rotated such that its internal structure is arranged or configured to block the rays 4 which are polarized in a certain direction. As also shown in FIG. 3, the polarizing filter 22 is mounted or located in front of the weapon sight 20 so as to attenuate or block the linearly polarized light rays 4 before they enter into the weapon sight 20. As noted above, it is the common and conventional practice when using a weapon sight 20 to locate the polarizing filter 22 so that it blocks or attenuates the poalrized light before it reaches the weapon sight.

Figure 2:
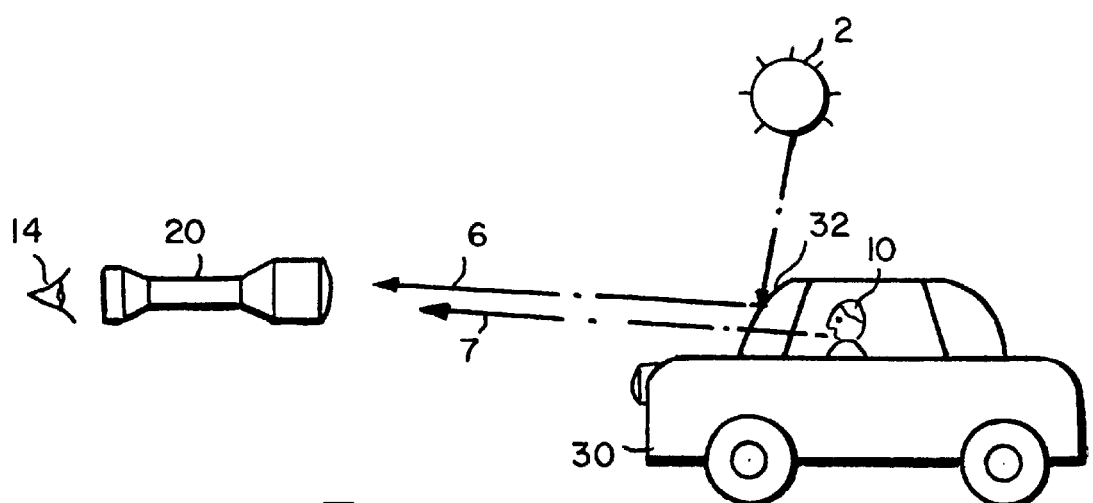
FIG. 2 is a diagrammatic view of a target viewing situation involving a motor vehicle.
Figure 4:
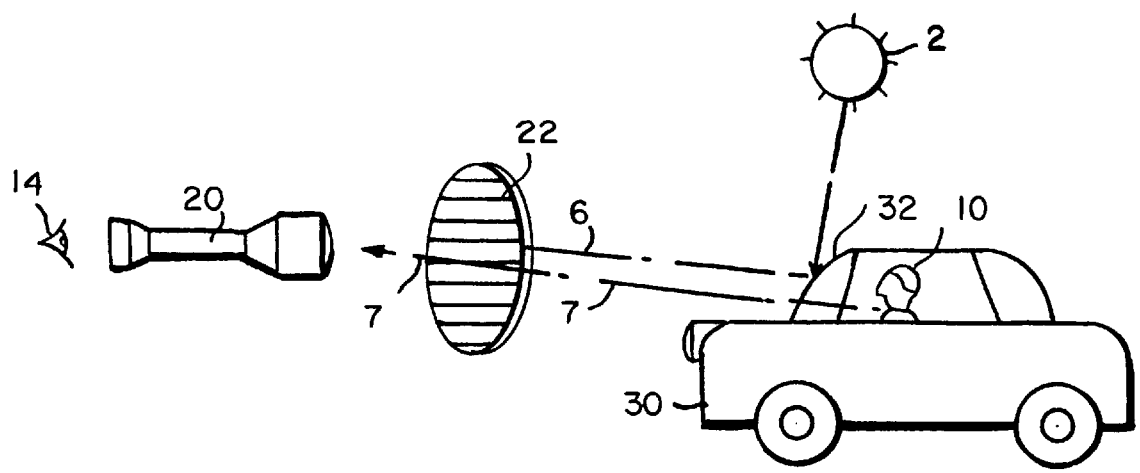
FIG. 4 is a diagrammatic view of a target viewing situation involving a motor vehicle with a conventionally configured weapon sight.

Now referring also to FIG. 4, there is shown a diagrammatic view similar to that shown in FIG. 2, but where a polarizing filter 22 is disposed at the front of the weapon sight 20. The polarizing filter 22 attenuates the polarized light rays 4 comprising the reflections 6 from the motor vehicle windshield 32. In this way, the reflections 6 that are brighter than the interior vehicle light 7 are attenuated by the polarizing filter 22. This means that the eye 14 of the shooter using the weapon sight 20 sees an image formed mainly by the un-polarized light rays comprising the interior vehicle light 7 and coming directly from the person 10. In other words, the polarizing filter 22 in effect blocks the reflections 6 from the windshield 32 and allows the interior vehicle light 7 to pass therethrough. Consequently, the image being viewed by the shooter is not subject to the veiling effect of the brighter polarized light rays 4 comprising the reflections 6 from the surface of the windshield 32.

Figure 5:
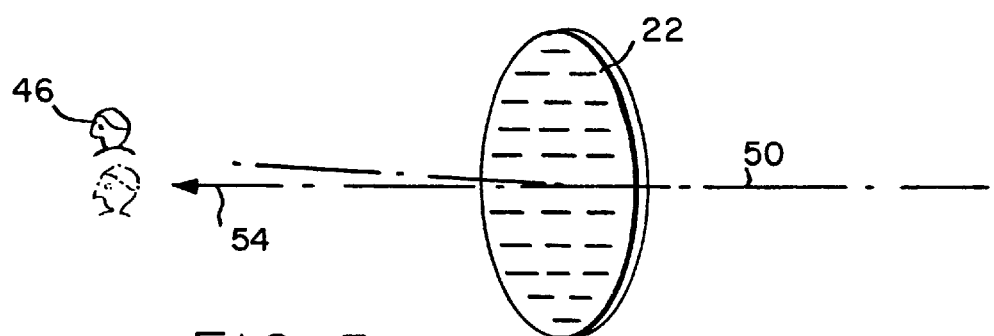
FIG. 5 is a pictorial view to illustrate image shifting caused by a filter.

As a practical matter a polarizing filter 22 cannot be constructed so it has perfectly parallel faces. As a result, and with reference to FIG. 5, the un-polarized light rays 50 passing through the polarizing filter 22 are refracted slightly by the filter. Thus, the light rays passing therethrough exit the polarizing filter 22 along a path 52 that is refracted slightly from the path 54 the light rays would have taken if the filter was not present. This refraction of the light rays in turn causes a shift in the image 46 as seen through a weapon sight from the dotted line image to the solid line image as shown in FIG. 5. The dotted line image is the image that would be seen through the weapon sight if the light rays 50 were not refracted and traveled on the non-refracted path 54.

The optical system comprising the weapon sight 20, typically is arranged or configured with an aligning or sighting mechanism, such as a reticle, that can be used by a shooter to determine where the projectile being fired from a weapon will impact. The reticle is typically located at a focal plane within the scope or weapon sight. When the polarizing filter 22 is located in front of the weapon sight 20, the refraction of the interior vehicle light 7 shifts the focused or internal image before it reaches the reticle. As a consequence of this image shifting, the reticle or the cross-hairs of the recticle no longer coincides with where the projectile is going to hit or impact. In other words, the shifting cause the point of imapct to change.

In accordance with the conventional technique, shooters currently position the polarizing filter 22 so it is mounted in front of the scope or weapon sight 22 and mounted so the filter has the same rotational orientation. If the polarizing filter 22 can be mounted in the same rotational relationship to the weapon sight 20, the known shift in the image and thus the shift in the point of impact of the weapon caused by the filter's refraction can be counteracted by employing a known correction adjustment to the weapon sight. As such, the shooter looks up the correction factor and adjusts the weapon sight settings accordingly. For example, a shooter looks up in a table or the like how many "clicks of correction" have to be dialed in to get the center of the cross hairs back to the point of impact. The "clicks of correction" are adjusting the internal location of the reticle cross hairs so that the cross-hairs again coincide with the point of impact of the bullet. These correction settings are determined by means of test(s) done under controlled conditions on a range and not under actual in-use conditions.

Unfortunately, a polarizing filter 22 must be rotated to a different angle each time it is used by a shooter, depending on the orientation of the sun 2 or sky glare, the orientation of the weapon sight 20 and the orientation of the surface the shooter is trying to see through. Each different angle of rotation of the polarizing filter 22, and thus each different angle of shift of the image, requires a different correction factor to be provided or dialed in. Consequently, it is not practical to adjust the weapon sight 20 in the field to counteract for such a range of impact displacements caused by the refraction of the polarizing filter 22.

Figure 6:
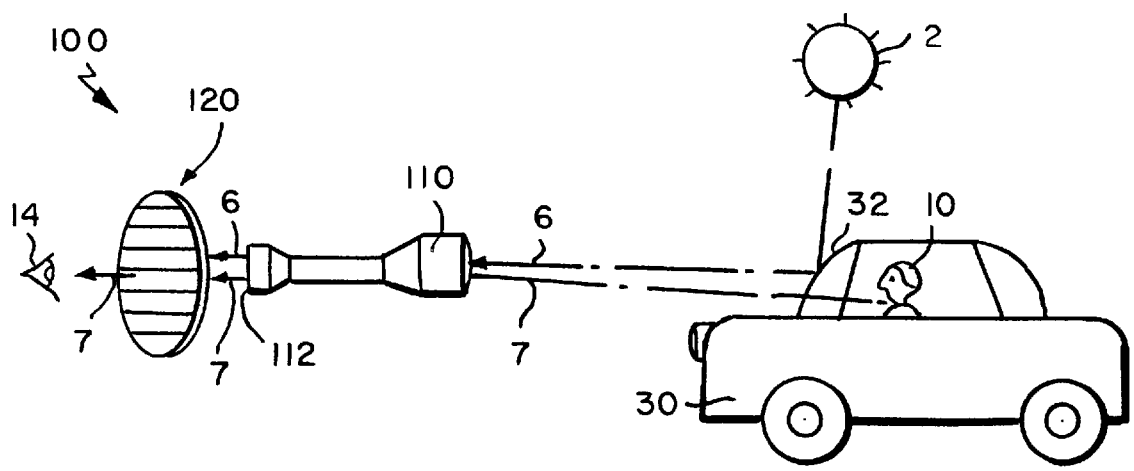
FIG. 6 is a diagrammatic target viewing situation when using a weapon sight according to the present invention.

Referring now to FIG. 6, there is shown a diagrammatic view of a viewing situation in which a target viewing apparatus 100 according to the present invention is being used to view the interior of a motor vehicle 30, the target area, through the windshield 32. The target viewing apparatus 100 is particularly arranged or configured to minimize or attenuate the reflections from a surface of the windshield while viewing the target area through the windshield and which does such attenuation of the reflections without affecting the point of impact of a projectile.

The target viewing apparatus 100 includes a telescopic viewing mechanism 110 and a polarizing filter 120 that is mounted so as to be disposed or located between the exit aperture 112 or eyepiece of the telescopic viewing mechanism 110 and the eye 14 of the person (e.g., police officer, federal law enforcement or military personnel-soldier) viewing the target area. In particular embodiments, the polarizing filter 120 is at or proximal the exit aperture. The telescopic viewing mechanism 110 in a specific embodiment is any of a number of weapon sights known in the art. However, it is within the scope of the present invention to configure any telescopic device known in the art (e.g., target ranging scope), which includes a reticle or other sighting mechanism and which would be subject to the image shifting problem described herein, with a polarizing filter mounted to or otherwise disposed at or proximal the exit or rear of such other device as taught herein.

As shown in FIG. 6, the reflections 6 from the surface of the windshield 32 and the interior vehicle light 7 passes through the telescopic viewing mechanism 110 such as a weapon sight. The reflections 6 and interior vehicle light 7 exit through the exit aperture 112 or eyepiece so as to impinge upon the polarizing filter 120. The polarizing filter 120 is arranged as is known to those skilled in the art so as to block or attenuate the polarized light rays 4 comprising the reflections 6 and so the non-polarized light rays of the interior vehicle light 7 passes through the polarizing filter. In this way, the shooter or other is presented with a clear image or view of the vehicle interior or target area and any object or targets therein.

Also by so placing the polarizing filter 120 behind the reticle of the telescopic viewing mechanism 110 or weapon sight, as well as the focused or internal image of the vehicle interior, the above-described problem of image shifting is eliminated. Thus, a shooter does not have to adjust the cross-hairs of the reticle to counter-act the image shifting caused by refraction or lookup the correction or adjustment factors as is done in the conventional technique. This is so because by disposing the polarizing filter optically behind the telescopic viewing mechanism 110 between the exit aperture 112 and the eye 14, the filter shifts both the reticle and the focused or internal image at the same time. The reticle and internal image are thus not shifted with respect to each other, and thus the point of impact for the fired projectile (e.g., bullet) is not changed by the refraction. In other words the point of impact does not change from what the shooter sees in the weapon sight or the telescopic viewing mechanism 110.

In sum, and in contrast to the conventional technique, the above-described apparatus 100 and method provides a shooter a clear view of a target area and any targets therein that are behind reflective surfaces, such as windows of buildings or vehicles, without affecting the crucially important accuracy of the shooter's weapon. Such an apparatus 100 and method also does not require the shooter, as is done with the described conventional technique, to make adjustments to the cross-hairs of the reticle to counteract refraction by the polarizing filter 120 so that point of impact is not different from that seen in the weapon sight.

It should be recognized that the foregoing is exemplary and illustrative of certain targeting viewing situations involving motor vehicles. This, however, shall not be construed as a limitation as it is within the scope of the present invention for the apparatus and method of the present invention to be used in a wide variety of physical situations in which the area or objects being viewed can be obscured because of reflections from a bright source and include maritime as well as aeronautical situations. Additionally, it should be recognized that the method and apparatus of the present invention is adaptable for use in viewing under a wide range of environmental and lighting conditions.

Although a preferred embodiment of the invention has been described using specific terms, such description is for illustrative purposes only, and it is to be understood that changes and variations may be made without departing from the spirit or scope of the following claims.

What is claimed is:

1. A method for viewing an object from a first side of a transparent medium, the first side being a reflective surface, when the object is located on an opposite side of the transparent medium, the viewing method comprising the steps of providing a telescopic viewing mechanism;

mounting a polarizing filter at an exit aperture of the telescopic viewing mechanism, the filter being configured to significantly attenuate light being reflected from the transparent medium first side; and passing light from the object through the telescopic viewing mechanism and through the polarizing filter, whereby shifting of the object's image through the telescopic viewing mechanism is eliminated.

2. The object viewing method of claim 1, further comprising the steps of:

filtering light being reflected from the transparent member first side and passing through the telescopic viewing mechanism using the filter.

3. The object viewing method of claim 1, wherein the telescopic viewing mechanism is a sight for a weapon and wherein the step of mounting includes disposing the filter optically behind the weapon sight.

4. The object viewing method of claim 3, wherein the step of disposing includes disposing the filter optically behind the internal image and reticle of the weapon sight.

5. The object viewing method of claim 1, wherein the filter being mounted is a polarizing filter.

6. A method for attenuating light being reflected from a reflective surface of a transparent member while viewing an object located opposite to the reflective surface using a telescopic viewing mechanism, the light attenuating method comprising the steps of:

mounting a polarizing filter proximal an exit aperture of the telescopic viewing mechanism;

filtering light being reflected by the reflective surface and passing through the telescopic viewing mechanism using the polarizing filter; and passing light from the object through the telescopic viewing mechanism and the polarizing filter for viewing, whereby the location of the object, as viewed through the telescopic viewing mechanism, is not shifted.

7. The light attenuating method of claim 6, wherein the telescopic viewing mechanism is a sight for a weapon and wherein the step of mounting includes disposing the filter optically behind the weapon sight.

8. The light attenuating method of claim 7, wherein the step of disposing includes disposing the filter optically behind the internal image and reticle of the weapon sight.

9. The object viewing method of claim 1, wherein the telescopic viewing mechanism being provided includes a sighting mechanism and wherein the viewing method further comprises the step of filtering light being reflected from the transparent member's first side without causing a relative shifting between the sighting mechanism and the focused image internal to the telescopic viewing mechanism.

10. The object viewing method of claim 9, wherein the sighting mechanism comprises a reticle.

11. The light attenuating method of claim 6, wherein the telescopic viewing mechanism includes a sighting mechanism and wherein said step of passing light includes passing light through the telescopic viewing mechanism and the polarizing filter without causing a relative shifting between the sighting mechanism and the focused image internal to the telescopic viewing mechanism.

12. The light attenuating method of claim 11, wherein the sighting mechanism comprises a reticle.

13. A method for using a polarizing filter with a telescopic viewing mechanism mounted on a weapon, the method comprising the steps of:

providing a telescopic viewing mechanism;

mounting a polarizing filter at an exit aperture of the telescopic viewing mechanism; and viewing an object through the telescopic viewing mechanism and positioning the weapon such that the point of impact from a projectile fired from the weapon is aimed at the object, whereby light from reflective surfaces passing through the telescopic viewing mechanism is minimized by the polarizing filter and whereby the point of impact of a projectile fired from the weapon is not affected by the polarizing filter.

* * * * *